United States Patent
Araoka et al.

(10) Patent No.: US 9,920,403 B2
(45) Date of Patent: Mar. 20, 2018

(54) MAGNESIUM ALLOY MEMBER AND PRODUCTION METHOD THEREFOR

(71) Applicant: NHK SPRING CO., LTD., Yokohama-shi, Kanagawa (JP)

(72) Inventors: Yuji Araoka, Yokohama (JP); Tohru Shiraishi, Yokohama (JP); Yoshiki Ono, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 543 days.

(21) Appl. No.: 14/395,121

(22) PCT Filed: Mar. 29, 2013

(86) PCT No.: PCT/JP2013/059684
§ 371 (c)(1),
(2) Date: Oct. 17, 2014

(87) PCT Pub. No.: WO2013/157376
PCT Pub. Date: Oct. 24, 2013

(65) Prior Publication Data
US 2015/0104669 A1    Apr. 16, 2015

(30) Foreign Application Priority Data
Apr. 18, 2012 (JP) .................................. 2012-094985

(51) Int. Cl.
*C22C 23/06* (2006.01)
*B22F 3/10* (2006.01)
(Continued)

(52) U.S. Cl.
CPC ............ *C22C 23/06* (2013.01); *B21C 23/001* (2013.01); *B21C 23/005* (2013.01);
(Continued)

(58) Field of Classification Search
CPC ........ C22F 1/06; C22C 23/00; B22D 11/0611
See application file for complete search history.

(56) References Cited

U.S. PATENT DOCUMENTS

| | | | |
|---|---|---|---|
| 4,990,198 A | 2/1991 | Masumoto et al. | |
| 5,078,962 A | 1/1992 | Regazzoni et al. | |

(Continued)

FOREIGN PATENT DOCUMENTS

| | | |
|---|---|---|
| JP | A-03-010041 | 1/1991 |
| JP | A-03-090530 | 4/1991 |

(Continued)

OTHER PUBLICATIONS

Wen-Cai, L. et al., "Influence of shot peening on high cycle fatigue properties of ZK60 magnesium alloy," The Chinese Journal of Nonferrous Metals, Oct. 2009, pp. 1733-1740, vol. 19, No. 10.

(Continued)

*Primary Examiner* — Colleen Dunn
*Assistant Examiner* — Jeremy Jones
(74) *Attorney, Agent, or Firm* — Oliff PLC (57) ABSTRACT

A high-strength magnesium alloy member is suitable for products in which at least one of bending stress and twisting stress primarily acts. The member has required elongation and 0.2% proof stress, whereby strength and formability are superior, and has higher strength and large compressive residual stress in the vicinity of the surface of a wire rod. In the magnesium alloy member formed as a wire rod in which at least one of bending stress and twisting stress primarily acts, the wire rod includes a surface portion having the highest hardness of 170 HV or more in the vicinity of the surface and an inner portion having a 0.2% proof stress of 550 MPa or more and an elongation of 5% or more, and the wire rod has the highest compressive residue stress in the vicinity of the surface of 50 MPa or more.

19 Claims, 3 Drawing Sheets

(51) Int. Cl.
- *B22F 3/20* (2006.01)
- *B22F 3/24* (2006.01)
- *B22F 5/12* (2006.01)
- *C22C 23/00* (2006.01)
- *C22C 1/02* (2006.01)
- *C22F 1/06* (2006.01)
- *B22D 11/00* (2006.01)
- *B22D 21/00* (2006.01)
- *C22C 23/02* (2006.01)
- *C22C 1/04* (2006.01)
- *B22D 11/06* (2006.01)
- *B21C 23/00* (2006.01)
- *C21D 7/06* (2006.01)
- *C21D 8/06* (2006.01)
- *C21D 7/00* (2006.01)

(52) U.S. Cl.
CPC ........ *B22D 11/005* (2013.01); *B22D 11/0611* (2013.01); *B22D 21/007* (2013.01); *B22F 3/24* (2013.01); *B22F 5/12* (2013.01); *C21D 7/06* (2013.01); *C21D 8/06* (2013.01); *C22C 1/02* (2013.01); *C22C 1/0408* (2013.01); *C22C 23/00* (2013.01); *C22C 23/02* (2013.01); *C22F 1/06* (2013.01); *B22F 3/10* (2013.01); *B22F 3/20* (2013.01); *B22F 2998/10* (2013.01); *C21D 7/00* (2013.01); *Y02P 10/212* (2015.11); *Y10T 428/12* (2015.01); *Y10T 428/12993* (2015.01)

(56) References Cited

U.S. PATENT DOCUMENTS

| | | | | |
|---|---|---|---|---|
| 5,221,376 A | * | 6/1993 | Masumoto | C22C 45/005 148/403 |
| 5,304,260 A | * | 4/1994 | Aikawa | C22C 45/005 148/403 |
| 8,016,955 B2 | * | 9/2011 | Park | C22C 45/005 148/403 |
| 2004/0163744 A1 | | 8/2004 | Oishi et al. | |
| 2009/0035171 A1 | | 2/2009 | Kawamura et al. | |

FOREIGN PATENT DOCUMENTS

| | | |
|---|---|---|
| JP | A-05-070880 | 3/1993 |
| JP | 05306424 A * | 11/1993 |
| JP | H05306424 A | 11/1993 |
| JP | A-06-316740 | 11/1994 |
| JP | A-2003-293069 | 10/2003 |
| JP | A-2012-087327 | 5/2012 |
| WO | WO 2007/111342 A1 | 10/2007 |
| WO | WO 2012/050188 A1 | 4/2012 |

OTHER PUBLICATIONS

Dec. 2, 2015 Office Action issued in Chinese Patent Application No. 201380020508.1.

Oct. 26, 2015 Office Action issued in Koren Patent Application No. 10-2014-7030849.

Jul. 2, 2013 International Search Report issued in International Application No. PCT/JP2013/059684.

* cited by examiner

MAGNESIUM ALLOY MEMBER AND PRODUCTION METHOD THEREFOR

TECHNICAL FIELD

The present invention relates to a magnesium alloy member and to a production method therefor, which are suitable for products in which at least one of bending stress and twisting stress primarily acts.

BACKGROUND ART

In various fields, such as aerospace, vehicles (automobiles, motor cycles, trains), medical instruments, welfare devices, and robots, low weights of parts are desired for improvement of function, improvement of performance, and improvement of operability. Specifically, in the field of vehicles such as automobiles, emission amounts of carbon dioxide has been desired to be reduced in concern for the environment. Therefore, the need to reduce weight to reduce fuel consumption has become increasingly stringent every year.

Development of lightweight parts has been active primarily in the field of vehicles, and great strengthening of steels by improvements in composition, surface modifications, and combination thereof in steels has been primarily researched. For example, high-tension steels have been primarily used for springs, which are typical strong parts, and fatigue strength thereof is further improved by applying surface modification such as nitriding and shot peening, thereby yielding lightweight springs. However, great strengthening of steels by conventional improvements in composition is nearing limits, and great reductions in weight in the future cannot be anticipated.

Therefore, lightweight alloys, typically having low specific gravity, such as titanium alloys, aluminum alloys, and magnesium alloys are desired for further reduction in weight. Magnesium alloys have the lowest specific gravity in the practical metals, which is about 1/4 of that of steels, about 1/2.5 of that of titanium alloys, and about 1/1.5 of that of aluminum alloys. Therefore, magnesium alloys have great advantages in being low in weight and as a resource, and they are expected to be widely used in the market.

However, conventional magnesium alloys are limited in use as products. The main reason for this is that the strengths of the conventional magnesium alloys are low. Therefore, in order to obtain strength for parts, it is necessary to increase size of parts compared to that of the conventional steel parts. That is, the conventional magnesium alloys have not been accepted as strong parts in the market since low weight and compact size are incompatible.

Under such circumstances, research in high-strength magnesium alloys for use as strong parts has been actively made. For example, Patent Document 1 discloses a technique in which a molten Mg—Al—Zn—Mn—Ca-RE (rare earth) alloy is subjected to wheel casting, thereby forming a solid member, which is drawn and densified, thereby obtaining a magnesium alloy member having a 0.2% proof stress of 565 MPa.

Patent Document 2 discloses a technique in which a molten Mg—X-Ln (X is one or more of Cu, Ni, Sn, and Zn; Ln is one or more of Y, La, Ce, Nd, Sm) alloy is rapidly cooled and solidified, thereby yielding an amorphous foil strip composed of a magnesium alloy foil strip having a hardness of 200 HV or more.

Patent Document 3 discloses a technique in which a cast material or an extruded material composed of a Mg—Al—Mn alloy is drawn, thereby obtaining a magnesium alloy wire having a tensile strength of 250 MPa or more and an elongation of 6% or more.

Patent Document 1 is Japanese Unexamined Patent Application Publication No. 3-90530. Patent Document 2 is Japanese Unexamined Patent Application Publication No. 3-10041. Patent Document 2 is Japanese Unexamined Patent Application Publication No. 2003-293069.

The techniques disclosed in the publications are effective for greatly strengthening magnesium alloys. However, in the magnesium alloy disclosed in Patent Document 1, mechanical properties for satisfying requirements of the market for strong parts are not sufficient. For example, when it is assumed that the alloy is used in a spring in which at least one of bending stress and twisting stress primarily acts, according to estimates by the inventors, the magnesium alloy wire rod must have a 0.2% proof stress of 550 MPa or more in an inner portion of the wire rod and a 0.2% proof stress of 650 MPa or more in the vicinity of the surface of the wire rod if the size of the wire rod is the same as that of existing steel springs and light weight can be achieved. Furthermore, in order to form a coiled spring, at least an elongation of 5% or more in an inner portion is required. However, in the alloy member disclosed in Patent Document 1, which has the highest 0.2% proof stress of 565 MPa, the ductility is low and the elongation is only 1.6%. On the other hand, in the alloy member disclosed in Patent Document 1, which has the highest ductility and an elongation of 4.7%, the elongation is close to the value that is required in the present invention. However, the strength is low in a 0.2% proof stress of 535 MPa, and the requirement is not satisfied.

In the magnesium alloy disclosed in Patent Document 2, a hardness of 170 HV or more is obtained. The hardness corresponds to 0.2% proof stress of 650 MPa or more according to estimates by the inventors. However, in Patent Document 2, properties related to ductility are not disclosed. The magnesium alloy disclosed in this publication contains a large amount of rare earth elements and 50% of amorphous phase, whereby the ductility is extremely low, and it is easily assumed that sufficient elongation is not obtained. Furthermore, amorphous phases show poor thermal stability and easily crystallize by external causes such as environmental temperature. Since a mixed-phase alloy of amorphous phase and crystal phase causes large variation in the properties according to the proportion of the phases, it is difficult to stably produce products having uniform properties, and it is not suitable for applying to industrial products because of difficulty in guaranteeing quality in the market.

In the magnesium alloy disclosed in Patent Document 3, the elongation is 6% or more and shows sufficient ductility. However, the tensile strength is 479 MPa at most, and the above-mentioned 0.2% proof stress of 550 MPa or more in the inner portion of the wire rod is not obtained.

In order to improve fatigue strength of parts in which at least one of bending stress and twisting stress primarily acts, it is effective to apply the compressive residual stress on the surface thereof by shot peening, etc. However, in the conventional magnesium alloys, it is difficult to obtain sufficient compressive residual stress to improve the fatigue strength, since yield stress (that is, 0.2% proof stress) thereof is low. For example, the applied compressive residual stress is about 50 MPa or less, even if the compressive residual stress is applied to a conventional magnesium alloy by shot peening.

DISCLOSURE OF THE INVENTION

Thus, the conventional magnesium alloys do not satisfy 0.2% proof stress and elongation for strong parts (for example, springs) to which at least one of bending stress and twisting stress primarily acts, and do not have sufficient fatigue strength. Therefore, an object of the present invention is to provide a magnesium alloy member and a production method therefor, in which 0.2% proof stress and elongation, which are in a trade-off relationship, are both satisfied, whereby strength and formability (ductility required for bending and coiling) are improved, and higher surface strength and higher surface compressive residual stress are provided, thereby being suitable for products in which at least one of bending stress and twisting stress primarily acts.

The present invention provides a magnesium alloy member formed as a wire rod, in which at least one of bending stress and twisting stress primarily acts, in which the wire rod includes a surface portion having the highest hardness of 170 HV or more in the vicinity of a wire rod surface; and an inner portion having a 0.2% proof stress of 550 MPa or more and an elongation of 5% or more, and the wire rod has the highest compressive residue stress in the vicinity of the wire rod surface of 50 MPa or more.

Additionally, the present invention provides a magnesium alloy member formed as a wire rod, in which at least one of bending stress and twisting stress primarily acts, in which the wire rod includes: a surface portion having the highest hardness of 170 HV or more in the vicinity of a wire rod surface; and an inner portion having a 0.2% proof stress of 550 MPa or more and an elongation of 5% or more, and the wire rod has an integrated value $I_{oR}$ of compressive residue stress in a region from the wire rod surface to a crossing point of 7 MPa·mm or more, when a depth from the wire rod surface in which a value of compressive residual stress in residual stress distribution from the wire rod surface in a depth direction is zero is set to be a crossing point.

The vicinity of a wire rod surface of a member is defined as a range from a wire rod surface of a member to a depth of about d/10 (d is a diameter of the wire rod). Since the wire rod has a surface portion having the highest hardness of 170 HV or more in the vicinity of the wire rod surface, 0.2% proof stress of 650 MPa or more in the vicinity of the wire rod surface of the member can be achieved, as mentioned above. In the present invention, although yield stress (that is, 0.2% proof stress) gradually decreases from in the vicinity of the wire rod surface to the center of the wire rod, the inner portion of the wire rod has a 0.2% proof stress of 550 MPa or more and an elongation of 5% or more.

Thus, since the present invention has a high-strength and high-ductile inner portion and a higher-strength portion in the vicinity of the wire rod surface, 0.2% proof stress and elongation which are in a trade-off relationship can be satisfied for products in which at least one of bending stress and twisting stress primarily acts by providing suitable distribution of mechanical properties. Furthermore, since the highest compressive residual stress in the vicinity of the wire rod surface is sufficiently high, which is 50 MPa or more, generation of initial cracks on the outermost surface of the wire rod can be prevented and fatigue resistance can be improved. In this case, the compressive residual stress can be provided, for example, by shot peening, and the above highest compressive residual stress can be obtained, since yield stress in the vicinity of the wire rod surface is high. When the highest compressive residual stress in the vicinity of the wire rod surface is less than 50 MPa, it is difficult to have sufficient fatigue strength. Here, it is more preferable that the highest compressive residual stress in the vicinity of the wire rod surface be 100 MPa or more.

According to the present invention, an integrated value $I_{oR}$ of compressive residual stress in a region from the wire rod surface of the member to the crossing point is 7 MPa·mm or more. Therefore, high compressive residual stress is provided not only at the wire rod surface of the member but also at the inner portion of the wire rod, and generation of initial cracking at the inner portion of the wire rod can also be effectively prevented in addition to at the wire rod surface of the member. When the integrated value $I_{oR}$ of compressive residual stress is less than 7 MPa·mm, it is difficult to sufficiently provide the effect. Here, it is preferable that the $I_{oR}$ be 10 MPa·mm or more, and it is more preferable that the $I_{oR}$ be 20 MPa·mm or more.

In the present invention, it is preferable that the compressive residual stress in a region from the wire rod surface of the member to a depth of 0.1 mm be 50 MPa or more and the crossing point be 0.2 mm or more. In the member that satisfies this requirement, high compressive residual stress is provided in a region from the wire rod surface of the member to a greater depth. As a result, generation of initial cracking on the inner portion of the wire rod can be further effectively prevented in addition to at the wire rod surface of the member. When the compressive residual stress in a region from the wire rod surface of the member to a depth of 0.1 mm is less than 50 MPa and the crossing point is less than 0.2 mm, it is difficult to have high fatigue strength since sufficient compressive residual stress is not provided on the inner portion of the wire rod of the member. Here, it is more preferable that the compressive residual stress to a depth of 0.1 mm be 100 MPa or more.

In addition, the magnesium alloy of the present invention preferably consists of, by atomic %, Ni: 2 to 5%, Y: 2 to 5%, and the balance of Mg and inevitable impurities. In the following, composition of materials and reasons for limitations on the values thereof will be explained.

Ni: 2 to 5 atomic %

Zn has been conventionally added in magnesium alloys as a primary additional element for improving strength and ductility. However, Zn is not sufficient for compatibility of high strength and ductility. Therefore, Ni is preferably added in magnesium alloys as a primary additional element. Ni has a large effect for improving high strength and high ductility compared to Zn.

Y: 2 to 5 atomic %

High strength, which is required in the present invention, is not easily achieved merely by adding Ni, which greatly contributes to improving high levels of strength and high levels of ductility. Therefore, Y is preferably added as a secondary additional element. A high-strength compound phase of the Mg—Ni—Y type is formed by adding Y. Y has high solubility with respect to Mg and is effective for solid-solution strengthening in an α-Mg phase. Furthermore, by combining with yielding a raw material by a rapid solidification method, as mentioned below, greater strengthening can be achieved.

When Ni is less than 2 atomic % and Y is less than 2 atomic %, the highest hardness in the vicinity of the surface is not a sufficient hardness and the strength is not sufficient for strength parts in which at least one of bending stress and twisting stress primarily acts. On the other hand, when Ni is more than 5 atomic % and Y is more than 5 atomic %, formability is extremely deteriorated and breakage occurs in extruding. In this case, the amount of high-hardness compounds formed by Ni and Y increases and the compounds become coarse, whereby the deformation resistance of the alloy increases and the toughness of the alloy is decreased, and thereby the alloy breaks.

Here, the magnesium alloy of the present invention is not limited to compositions composed of three elements of Mg, Ni, and Y. The main elements are Mg, Ni, and Y, and a third element such as Zr and Al can be added for refinement of crystal grain and improvement of corrosion resistance.

Next, the present invention provides a production method for a magnesium alloy member, including: a step for yielding a raw material in a form of foil strips, foil pieces, or fibers of a magnesium alloy by a rapid solidification method, a sintering step for forming a billet by bonding, compressing, and sintering the raw material, a step for plastic working the billet to form a plastic worked member, a step for forming the plastic worded member, and a step for providing compressive residual stress to the plastic worked member after plastic working, thereby obtaining the above-mentioned member.

In the present invention, a raw material having the above-mentioned compositions in a form of foil strips, foil pieces, or fibers of a magnesium alloy by rapid solidification method is preferably used. Therefore, special steps disclosed in Patent Document 1, in which a raw material is charged in a container a moment after forming or a raw material is subjected to canning, are not needed, although such steps are required for a powder having large specific surface area or an alloy having active composition.

The present invention provides another production method for a magnesium alloy member, including: a step for forming magnesium alloy fibers by a molten metal extraction method, a sintering step for forming a billet by bonding, compressing, and sintering the fibers, an extruding step for directly charging the billet into a container of a press machine and extruding the billet to form an extruded member, a step for forming the extruded member, a step for providing compressive residual stress to the extruded member after forming by shot peening, thereby obtaining the above-mentioned member.

In the present invention, a billet that is not subjected to canning is directly extruded, whereby a high-strength and high-ductile inner portion and a higher-strength portion in the vicinity of the wire rod surface of the member can be obtained. The high-strength and high-ductile inner portion and the higher-strength portion in the vicinity of the wire rod surface of the member are gradually connected and do not have a clear boundary of mechanical properties. This is greatly preferable for fatigue in which cyclic stresses act. When the portions have a clear boundary, the boundary may initiate a crack due to differences of hardness or elastic strain. Therefore, since the portions do not have a clear boundary and are gradually interconnected, there is no risk that a boundary will initiate a crack. In the present invention, since a billet is directly charged into a container of a press machine, the number of steps can be reduced and production cost can be lowered compared to the case in which canning is performed.

Here, for example, the magnesium alloy member of the present invention is suitably used for parts for a vehicle such as an automobile, and it is desirable that a diameter of a wire rod used in the member be 3 to 13 mm in order to satisfy required specifications. For example, the present invention is a spring using a wire rod having a diameter of 3 to 13 mm.

According to the present invention, a wire rod of a magnesium alloy member has high-surface strength and high formability. Therefore, by applying the invention to formed parts in which at least one of bending stress and twisting stress primarily acts, great reduction in weight of parts can be achieved without increasing size of parts, compared to conventional steel parts. Specifically, the present invention has strength and formability that are sufficient for, for example, automobile parts such as seat frames, which have higher proportion of weight and springs (suspension springs, valve springs, clutch torsion springs, torsion bars, stabilizers) which are required to have high strength.

MODE FOR CARRYING OUT THE INVENTION

1. Production of Raw Materials

A raw material of a magnesium alloy consisting of, by atomic %, Ni: 2 to 5%, Y: 2 to 5%, and the balance of Mg and inevitable impurities, is produced. A rapid solidification method such as a single roller method, a molten metal spinning method, and a molten metal extraction method was used, and a raw material in a form of foil strips, foil pieces, or fibers was produced. The amounts of additional elements contained by solid solution in an $\alpha$-Mg phase of foil strips, foil pieces, or fibers which is yielded by a rapid solidification method is large compared to common casting methods in which solidification rate is low. Therefore, even though amounts of additional elements are the same as in the casting method, the alloy is greatly strengthened by solid solution strengthening. The crystal grain is fine in a rapid solidification method. Fine crystal grain improves strength and elongation, and combined with solid solution strengthening, all of the mechanical properties are improved.

It should be noted that rapid solidification powders such as atomized powder that is yielded by rapid solidification of a raw material is not suitable for the present invention. Since Mg is active, an extremely thin oxide film is easily formed on a surface of the powder when Mg is exposed in air. In a powder having large specific surface area, the total area of the oxide film is extremely large compared to that of foil strips, foil pieces, or fibers. If obtained powder is exposed to air and subjected to sintering, the oxide film prevents bonding at the contacting surface of the particles. Even though particles are bonded, oxides or oxygen generated by resolution of the oxides is largely taken up by the particles. Thus, in powders having large specific surface area, poor bonding and embrittlement caused by contamination of oxygen and oxides easily occur, whereby the properties may be reduced compared to the case in which foil strips, foil pieces, or fibers are used. In order to avoid such disadvantages, powders must be subjected to canning in a moment after forming the powder. As a result, high strengthening in the vicinity of a surface of a wire rod after plastic forming (for example, extruding) is difficult, as mentioned below.

Under conditions in which a powder is used, there may be a concern that a dust explosion may occur. Therefore, active magnesium alloy powder cannot be handled in air. Specifically, if a powder is used, powder that is produced in a vacuum or in an inert atmosphere must not be exposed to air, and it is charged into a metallic capsule such as copper capsule in a sequential apparatus having a vacuum or an inert atmosphere. When an inert atmosphere is used, the metallic capsule is degassed and sealed. Thus, if powder is used, the above-mentioned canning in a vacuum process or an inert atmosphere process is required. In an apparatus for performing canning in a vacuum or in an inert atmosphere, the sizes of products are limited. Therefore, it is difficult to realize sequential processes composed of a vacuum process or an inert atmosphere process using powder in industrial mass-production with respect to parts having such sizes as springs for automobiles (suspension springs, valve springs, clutch torsion springs, torsion bars, stabilizers) and seat frames.

Figure 1A:
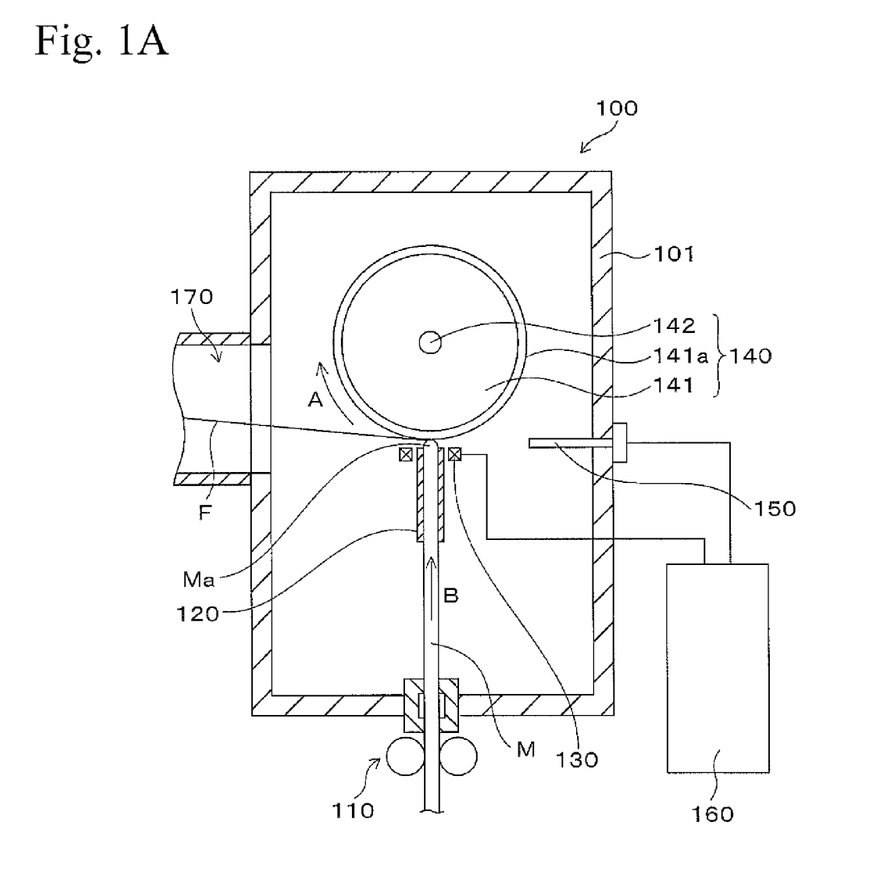
FIGS. 1A and 1B show a production apparatus for metallic fiber used in an embodiment of the present invention.
Figure 1B:
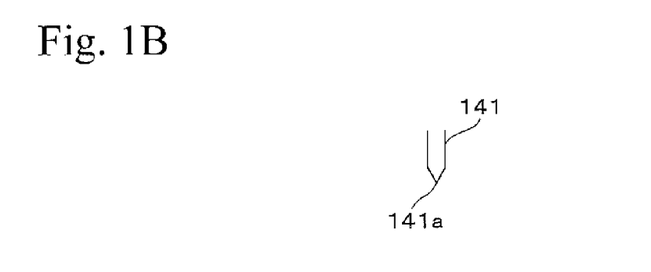

FIGS. 1A and 1B show schematic structures of a production apparatus for metallic fiber 100 (hereinafter referred to simply as "apparatus 100") for performing a step for forming a fiber in an embodiment of the present invention, FIG. 1A shows a cross sectional view of the entire apparatus 100 and FIG. 1B shows a cross sectional view of a circumferential portion 141a of a rotating disk 141. FIG. 1B is a side sectional view in a direction perpendicular to the plane of the paper of FIG. 1A.

The apparatus 100 is a production apparatus for metallic fiber using a molten metal extraction method. In the apparatus 100 using a molten metal extraction method, an upper end portion of a rod-shaped raw material M is melted, and a molten metal Ma contacts the circumferential portion 141a of the rotating disk 141, a portion of the molten metal Ma is extracted toward the direction of the substantially tangential line of the circumference of the disk 141, and is rapidly cooled, thereby forming a magnesium alloy fiber F. For example, a magnesium alloy such as Mg—Ni—Y type is used as a raw material M, and a magnesium alloy fiber F having a diameter of 200 µm or less is produced. The diameter of the magnesium alloy fiber F is not limited, and the diameter is selected according to production efficiency and handling facility in a later process. When the diameter is 200 µm or less, sufficient amounts of additional elements can be contained in an α-Mg phase by solid solution, and the structure can be fine.

As shown in FIG. 1A, the apparatus 100 includes a chamber 101 which can be sealed. A raw material feeding portion 110, a raw material holding portion 120, a heating portion 130, a metallic-fiber forming portion 140, a temperature measuring portion 150, a high-frequency current generating portion 160, and a metallic fiber receiving portion 170 are provided in the chamber 101.

An inert gas such as argon gas is provided in the chamber 101 as an atmosphere gas, thereby inhibiting reaction of impurities such as oxygen included and a molten material Ma. The raw material feeding portion 110 is located at the bottom of the chamber 101, feeds the raw material M toward the direction of the arrow B at predetermined speed, and provides the raw material M to the raw material holding portion 120. The raw material holding portion 120 prevents movement of the molten material Ma toward a radial direction thereof and guides the raw material M toward a suitable position of the fiber forming portion 140.

The raw material holding portion 120 is a tubular member and is located between the raw material feeding portion 110 and the metallic fiber-forming portion 140 and below the disk 141. The heating portion 130 is a high-frequency current induction coil that generates magnetic flux for melting the upper portion of the raw material M and forming the molten material Ma. As a material for the raw material holding portion 120, a material that does not react with the molten material Ma is preferable. Graphite is preferable as a material for the raw material holding portion 120 for practical use.

The metallic fiber forming portion 140 produces a magnesium alloy fiber F from the molten material Ma by the disk 141 that rotates around a rotating shaft 142. The disk 141 is made from copper or a copper alloy having high thermal conductivity. As shown in FIG. 1B, a V-shaped circumference 141a is formed on the circumferential portion of the disk 141.

The temperature measuring portion 150 measures the temperature of the molten material Ma. The high-frequency current generating portion 160 provides high-frequency current to the heating portion 130. The power of the high-frequency current generating portion 160 is controlled based on the temperature of the molten material Ma, which is measured by the temperature measuring portion 150, and the temperature of the molten material Ma is maintained to be constant. The metallic fiber receiving portion 170 receives the metallic fiber F that is formed by the metallic fiber forming portion 140.

In the above apparatus, the raw material feeding portion 110 continually feeds the raw material M in a direction of the arrow B, thereby supplying it to the raw material holding portion 120. The heating portion 130 melts the upper portion of the raw material M by induction heating, thereby forming the molten material Ma. Then, the molten material Ma is continually fed to the circumference 141a of the disk 141 rotating in the direction of the arrow A, the molten material Ma contacts the circumference 141a of the disk 141, a part thereof is extracted toward a direction of an approximate tangential line of the circle of the disk 141 and is rapidly cooled, thereby forming a magnesium alloy fiber F. The formed magnesium alloy fiber F extends toward the direction of an approximate tangential line of the circle of the disk 141 and received by the metallic fiber receiving portion 170 which is located in the direction in which the fiber F extends.

2. Sintering Step

The yielded raw material is formed into a billet for plastic working by sintering. Sintering is performed by atmosphere sintering, vacuum sintering, or discharge plasma sintering in a non-pressurized or a pressurized condition. Properties and quality of the billet after sintering affect properties and quality of products after plastic working. Therefore, in order to form a billet in which the cleanliness is high, the structure is uniform, and number of pores is small, sintering is preferably performed by a vacuum hot press (HP) apparatus which has a compressing mechanism and enables sintering in a vacuum or an inert gas atmosphere. By compressing heating in a vacuum or an inert gas atmosphere, a billet having few pores can be obtained.

In an HP apparatus, a heating chamber is disposed in a vacuum vessel, a mold is disposed in the heating chamber, a cylinder is disposed in the upper portion of the vacuum vessel, a press ram projected from the cylinder is vertically movable in the heating chamber, and an upper punch installed at the press ram is inserted into the mold. A magnesium alloy fiber F as a raw material is charged into the mold of the HP apparatus constructed as above, the vacuum vessel is evacuated or purged with an inert gas, and the heating chamber is heated to a predetermined sintering temperature. Then, the magnesium alloy fiber F is compressed by the upper punch inserted into the mold, and it is sintered.

The sintering is preferably performed at a temperature of 350 to 500° C. for 10 minutes or more at a pressure of 25 MPa or more. Under these conditions, a billet in which sintering is sufficiently promoted at contacting points of the magnesium alloy fibers can be obtained. More preferably, sintering is performed for 30 minutes or more at a pressure of 40 MPa or more. Under these conditions, a densified billet in which sintering is sufficiently promoted at contacting points of the magnesium alloy fibers and the porosity thereof is less than 10% can be obtained. It should be noted that when the heating temperature is less than 350° C., sintering is not sufficiently promoted at contacting points of the magnesium alloy fibers and large numbers of pores remain. In the products after plastic working, contacting points, which are not sufficiently sintered, and boundaries of magnesium alloy fibers which are not sintered, remain, whereby the strength is lowered. Therefore, the heating temperature is preferably 350° C. or more. When the heating temperature is more than 500° C., sintering is sufficiently promoted at contacting points of fibers and pores are few. However, under these conditions, the structure is coarse and products after plastic working do not have a fine structure. As a result, a magnesium alloy wire rod having sufficient strength cannot be obtained. Therefore, the heating temperature is preferably 500° C. or less.

When the raw material is a powder, sintering must be performed before sealing in canning. However, a big sequential apparatus for providing a vacuum or an inert atmosphere is required, and it is difficult to uniformly charge a powder into a mold or a metallic capsule in a closed apparatus. As a result, it is difficult to produce a densified compact. That is, if a powder is used, canning must be performed before the powder is exposed to air, and sintering of the particles in the compact in the capsule is insufficient. Furthermore, the compact has large numbers of pores and density thereof is not uniform. Since the compact has pores communicating with the surface thereof, the inner portion thereof is exposed to air after the metallic capsule is removed. Therefore, the metallic capsule cannot be removed in a condition of a billet, whereby the next process of plastic working must be performed in a condition of canning.

3. Plastic Working Step

Working from a billet to a wire rod is performed by warm plastic working such as drawing, rolling, extruding, or forging. Plastic working performed at a suitable temperature and a working ratio (reduction ratio of cross section) generates refinement of the structure caused by dynamic recrystallization and work hardening, and it is effective for high degree of strengthening of the magnesium alloy. In these plastic workings, drawing and extruding are preferable for wire rods in which at least one of bending stress and twisting stress primarily acts. In the plastic working, a uniform cross section, which is indispensable for a wire rod can be obtained and greater strain can be introduced in the surface area of the wire rod compared to the inner portion thereof. As a result, the structure in the surface area is further refined and strengthened compared to the inner portion.

Naturally, strength and elongation are in a trade-off relationship. Magnesium alloys in which the structure is refined and highly strengthened have been researched by using powders. Although the magnesium alloys had a high-strength structure, they did not have sufficient elongation and was not able to be formed in a shape of a part. Since the powder was charged into a metallic capsule and worked, strain generated by the working is preferentially introduced to the metallic capsule that was the outermost portion. Therefore, a high degree of strengthening of the portion in the vicinity of the wire rod surface, as can be obtained in the present invention, could not be obtained.

In the case in which a billet is produced by casting, a high degree of strengthening cannot be obtained even if the magnesium alloy has the same composition as in the present invention. The reason for this is that the crystal grain of an α-Mg phase in a cast metal is naturally coarse and precipitated compounds are also coarse, deformation resistance is large, and accumulation of strain is large, whereby the metal is shear fractured before obtaining a fine structure. Furthermore, the amounts of additional elements contained in the α-Mg phase by solid solution is small, whereby high strengthening of the α-Mg phase by solid solution is poor. In contrast, in the billet produced from foil strips, foil pieces, or fibers having fine structure, by sintering at a suitable temperature, the working resistance is small since the structure after sintering is fine. Therefore, since the billet has superior deformability, large strain can be introduced at a lower temperature in plastic working, and large internal energy, which is a driving force for recrystallization, can be accumulated, whereby further fine structure can be obtained. Furthermore, since the amount of additional elements contained in the α-Mg phase by solid solution is large, a high degree of strengthening is achieved as a result of both the large effects of solid-solution strengthening and the fine structure.

Figure 2:
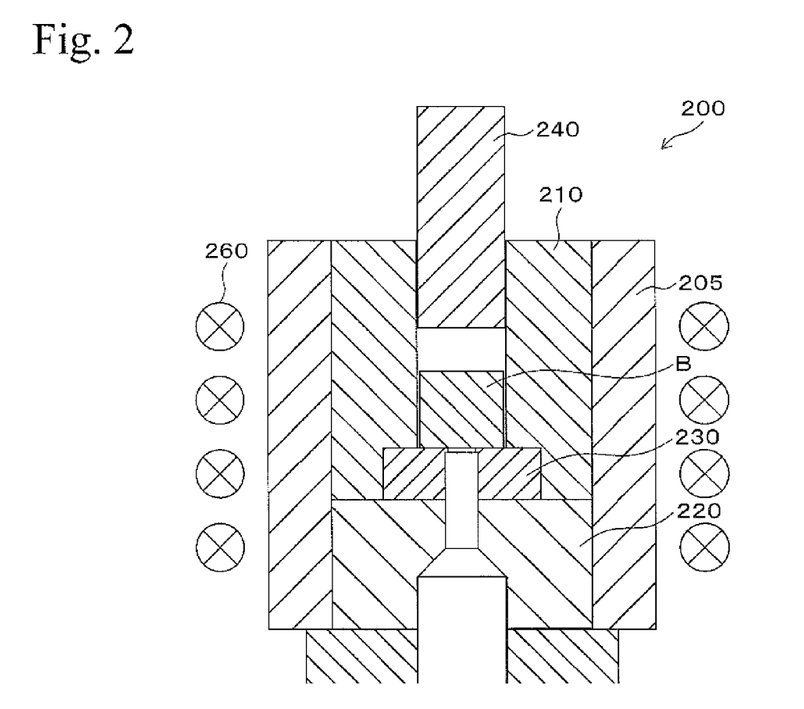
FIG. 2 shows an extrusion apparatus used in an embodiment of the present invention.

FIG. 2 shows an extruding apparatus 200 used when extruding is applied as plastic working. In FIG. 2, reference numeral 205 is an outer mold, reference numeral 210 is a container installed in the outer mold. The container 210 has a tubular shape. A lower mold 220 is coaxially disposed at an end surface of the container 210. A die 230 is disposed between the container 210 and the lower mold 220. A punch 240 is slidably inserted in the container 210. A heater 260 is disposed in the outer circumference of the container 210.

In the extruding apparatus 200, a billet B that is heated is charged into the container 210, the punch 240 moves downward, thereby compressing the billet B. The diameter of the compressed billet B is reduced by the die 230 and the billet B is extruded to the space of the lower mold 220, thereby forming a wire rod.

The extrusion in the extruding apparatus is preferably performed at a temperature of the billet B of 315 to 335° C., at an extrusion ratio of 5 to 13, and at a advancing speed of the punch 240 of 2.5 mm/second or less. Under these conditions, refinement of structure caused by dynamic recrystallization and work hardening caused by introduction of strain are sufficient. Therefore, a plastic worked member in which the inner portion of wire rod has high strength and high ductility and the portion in the vicinity of the wire rod surface has higher strength, is formed. Specifically, the portion in the vicinity of the wire rod surface has the highest hardness of 170 HV or more and the inner portion of the wire rod has a 0.2% proof stress of 550 MPa or more and an elongation of 5% or more, whereby a plastic worked member suitable as a strength part, in which at least one of bending stress and twisting stress primarily acts, is obtained.

It should be noted that when the heating temperature is less than 315° C., extruding is difficult since the deformation resistance is large, thereby resulting in breakage in extruding and rough surfaces and cracking at the surface of the wire rod. Even though a wire rod is formed, the hardness of the wire rod is too high and elongation is deteriorated, whereby elongation of 5% or more, which is required for formation, cannot be obtained. On the other hand, when the heating temperature is more than 335° C., refinement of structure caused by dynamic recrystallization and work hardening caused by introduction of strain are not sufficient. As a result, it is difficult to have sufficient hardness in the vicinity of the wire rod surface of the member.

The conditions in the extruding are not limited to the abovementioned range and below-mentioned examples, and they should be decided focusing on obtaining high strength and high elongation in the inner portion of the wire rod of the member and higher strength in the vicinity of the wire rod surface. That is, introduction of strain and inducement of dynamic recrystallization are affected by complex relationships of composition of the material, working ratio, working temperature, etc., whereby the conditions should be suitably decided based on theory, experience, and experimentation.

Here, the average crystal grain diameter of an α-Mg phase in the portion having the highest hardness in the vicinity of the wire rod surface of the plastic worked member is preferably 1 μm or less as measured by an EBSD method. It was well known that refinement of crystal grains greatly contributes to high degrees of strengthening as well as the theory of Hall-Petch. Refinement of crystal grains is effective for inhibiting generation of initial cracking on a surface of a fatigue part at which repeated stress acts. In the below-mentioned examples of the present invention having the highest hardness in the vicinity of the surface and the highest hardness is 170 HV or more, the average crystal grain diameter is extremely fine at 1 μm or less, whereby the examples are suitable for static strength and fatigue strength.

4. Forming Step

The plastic worked material may be formed in a desired product shape. For example, using a typical coiling machine, it may be formed in a spring shape.

5. Compressive Residual Stress Providing Step

Next, with respect to the plastic worked material after forming, the compressive residual stress is provided by shot peening. It is preferable that the shot peening be carried out at an average shot size of 0.01 to 0.5 mm and an impinging pressure of 0.1 to 0.5 MPa. Shot material is not limited, but it is desirable that it be harder than the material to be processed. According to such a shot peening condition, the high and deep compressive residual stress can be efficiently provided to the plastic worked material.

When the average shot size is less than 0.01 mm or when the impinging pressure is less than 0.1 MPa, it is difficult to obtain the high and deep compressive residual stress. In addition, when the impinging pressure exceeds 0.5 MPa or when the average shot size exceeds 0.5 mm, roughness of the wire rod surface of the plastic worked material is increased and initial destruction at the surface is easily generated. From this viewpoint, it is desirable that the highest surface roughness (Rz) of the wire rod after the shot peening be 20 μm or less. When the highest surface roughness (Rz) exceeds 20 μm, initial fatigue fracture at the surface is easily generated. Here, shot peening conditions such as shot size, impinging pressure, impinging duration, etc., is not limited to the above conditions, and they may be adjusted depending on desired compressive residual stress distribution.

The magnesium alloy member of the present invention is produced by the above steps. Since the hardness in the vicinity of the wire rod surface of the member is high, the compressive residual stress can be effectively provided, and the highest compressive residual stress in the vicinity of the wire rod surface is 50 MPa or more. In addition, the integrated value $I_{-oR}$ of compressive residue stress in a region from the wire rod surface of the member to a crossing point is 7 MPa·mm or more. Furthermore, the compressive residual stress in a region from the wire rod surface of the member to a depth of 0.1 mm is 50 MPa, and the crossing point is 0.2 mm or more. As described above, since the high and deep compressive residual stress is provided, the fatigue resistance is superior.

EXAMPLES

The present invention will be explained in detail by way of specific examples. Raw materials of each element for casting were weighed such that required composition of a magnesium alloy and required size of a cast metal were obtained, and raw materials were melted in a vacuum and were cast. The compositions of the cast metals are shown in Table 1. In the melting, a crucible made from graphite and a die made from a copper alloy were used. Fibers were produced using the apparatus shown in FIG. 1 according to a molten metal extraction method. In production of fibers according to the molten metal extraction method, a raw material holding portion made from graphite and a disk made from a copper alloy were used, and fibers having an average diameter of 60 μM were produced in an argon gas substituted inert atmosphere.

The produced fibers were directly charged into a sintering die made from graphite without calming, and they were sintered by an HP method, thereby obtaining a billet having a diameter of 15 mm and a length of 50 mm and a billet having a diameter of 33 mm and a length of 50 mm. The sintering according to the HP method was performed at a temperature of 300 to 525° C. and at a pressure of 50 MPa in an argon gas substituted inert atmosphere (atmosphere pressure of 0.08 MPa).

Next, the billet was formed to a wire rod using the extruding apparatus shown in FIG. 2. Specifically, a graphite type lubricant (provided by Japan Acheson, OILDAG-E) was used, the extruding speed (forward speed of the punch 240) was 0.01 to 5 mm/minute, and the extruding temperature was 300 to 425° C. as shown in Table 1. The billet having a diameter of 15 mm was extruded using a container 210 having an inner diameter of 16 mm and a die 230 having a bore diameter of 5 mm (extruding ratio of 10), thereby obtaining a wire rod. The billet having a diameter of 33 mm was extruded using a container 210 having an inner diameter of 35 mm, a die 230 having a bore diameter of 20 mm (extruding ratio of 3), a die 230 having a bore diameter of 15.5 mm (extruding ratio of 5), a die 230 having a bore diameter of 11 mm (extruding ratio of 10), a die 230 having a bore diameter of 9.7 mm (extruding ratio of 13), a die 230 having a bore diameter of 9 mm (extruding ratio of 15), thereby obtaining wire rods (Nos. 1 to 30). In addition, a cast billet was extruded for comparison, thereby obtaining wire rods (Nos. 31 to 33). Furthermore, a commercially available magnesium alloy AZ31 having a diameter of 5 mm was also prepared (No. 34).

In Table 1, the section specified by "Form of billet" shows a production method for a billet before extruding, "Fiber sintered body" shows a billet obtained by sintering fibers, and "Cast metal" shows a billet as cast. The results of extruding are also shown in Table 1. In Table 1, "Bad" indicates the case in which breakage occurred in extruding and a wire rod could not be obtained, "Not good" indicates the case in which rough surface and cracking at a surface of a wire rod was confirmed by visual inspection, although a wire rod was obtained, and "Good" indicates the case in which a good wire rod without rough surface and cracking was obtained.

TABLE 1

| No. | Composition (at %) Mg | Ni | Y | Form of billet | Sintering temperature (° C.) | Inner diameter of container (mm) | Extruding ratio | Extruding temperature (° C.) | Extruding speed (mm/s) | Result |
|---|---|---|---|---|---|---|---|---|---|---|
| 1 | 93.5 | 3.0 | 3.5 | Fiber sintered body | 400 | φ35 | 10 | 300 | 0.05 | Bad |
| 2 | ↑ | ↑ | ↑ | ↑ | ↑ | ↑ | ↑ | 305 | ↑ | Bad |
| 3 | ↑ | ↑ | ↑ | ↑ | ↑ | ↑ | ↑ | 310 | ↑ | Not good |
| 4 | ↑ | ↑ | ↑ | ↑ | ↑ | ↑ | ↑ | 315 | ↑ | Good |
| 5 | ↑ | ↑ | ↑ | ↑ | ↑ | ↑ | ↑ | 320 | ↑ | Good |
| 6 | ↑ | ↑ | ↑ | ↑ | ↑ | ↑ | ↑ | 325 | ↑ | Good |
| 7 | ↑ | ↑ | ↑ | ↑ | ↑ | ↑ | ↑ | 330 | ↑ | Good |
| 8 | ↑ | ↑ | ↑ | ↑ | ↑ | ↑ | ↑ | 335 | ↑ | Good |
| 9 | ↑ | ↑ | ↑ | ↑ | ↑ | ↑ | ↑ | 340 | ↑ | Good |
| 10 | ↑ | ↑ | ↑ | ↑ | ↑ | ↑ | ↑ | 350 | ↑ | Good |
| 11 | ↑ | ↑ | ↑ | ↑ | ↑ | ↑ | ↑ | 375 | ↑ | Good |
| 12 | ↑ | ↑ | ↑ | ↑ | ↑ | ↑ | ↑ | 400 | ↑ | Good |
| 13 | 98.0 | 1.0 | 1.0 | ↑ | ↑ | ↑ | ↑ | 325 | ↑ | Good |
| 14 | 96.0 | 2.0 | 2.0 | ↑ | ↑ | ↑ | ↑ | ↑ | ↑ | Good |
| 15 | 90.0 | 5.0 | 5.0 | ↑ | ↑ | ↑ | ↑ | ↑ | ↑ | Good |
| 16 | 93.5 | 3.0 | 3.5 | ↑ | 300 | ↑ | ↑ | ↑ | ↑ | Good |
| 17 | ↑ | ↑ | ↑ | ↑ | 350 | ↑ | ↑ | ↑ | ↑ | Good |
| 18 | ↑ | ↑ | ↑ | ↑ | 450 | ↑ | ↑ | ↑ | ↑ | Good |
| 19 | ↑ | ↑ | ↑ | ↑ | 500 | ↑ | ↑ | ↑ | ↑ | Good |
| 20 | ↑ | ↑ | ↑ | ↑ | 525 | ↑ | ↑ | ↑ | ↑ | Good |
| 21 | ↑ | ↑ | ↑ | ↑ | 400 | φ16 | ↑ | 325 | ↑ | Good |
| 22 | ↑ | ↑ | ↑ | ↑ | ↑ | ↑ | ↑ | 350 | ↑ | Good |
| 23 | ↑ | ↑ | ↑ | ↑ | ↑ | φ35 | 3 | 325 | ↑ | Good |
| 24 | ↑ | ↑ | ↑ | ↑ | ↑ | ↑ | 5 | ↑ | ↑ | Good |
| 25 | ↑ | ↑ | ↑ | ↑ | ↑ | ↑ | 13 | ↑ | ↑ | Good |
| 26 | ↑ | ↑ | ↑ | ↑ | ↑ | ↑ | 15 | ↑ | ↑ | Bad |
| 27 | ↑ | ↑ | ↑ | ↑ | ↑ | ↑ | 10 | ↑ | 0.01 | Good |
| 28 | ↑ | ↑ | ↑ | ↑ | ↑ | ↑ | ↑ | ↑ | 0.5 | Good |
| 29 | ↑ | ↑ | ↑ | ↑ | ↑ | ↑ | ↑ | ↑ | 2.5 | Good |
| 30 | ↑ | ↑ | ↑ | ↑ | ↑ | ↑ | ↑ | ↑ | 5 | Not good |
| 31 | 93.5 | 3.0 | 3.5 | Cast metal | — | ↑ | ↑ | 375 | 0.05 | Bad |
| 32 | ↑ | ↑ | ↑ | ↑ | — | ↑ | ↑ | 400 | ↑ | Not good |
| 33 | ↑ | ↑ | ↑ | ↑ | — | ↑ | ↑ | 425 | ↑ | Good |
| 34 | AZ31 | | | Extnded material | — | — | — | — | — | |

In each wire rod prepared as described above, the following various characteristics were tested for the test piece in which the result of extruding was "Not good" and "Good". The results are shown in Table 2.

Tensile tests of the produced wire rod were performed. In the tensile test, a test piece having a 1.6 mm thick parallel portion was machined from the wire rod having a diameter of 5 mm, and a test piece having a 3 mm thick parallel portion was machined from the wire rod having a diameter of 9 mm or more. The test pieces were subjected to tensile tests at room temperature using a universal testing machine (provided by Instron, No. 5586) at a test speed of 0.5 mm/minute. From the tensile test result, 0.2% proof stress and elongation were calculated.

Hardness of the wire rod was measured with respect to the below test piece of the wire rod, using a Vickers hardness testing machine (provided by Future-Tech, No. FM-600). The test piece was embedded in a resin so that the cross section of the extruded wire rod was exposed and mirror finished by mechanical polishing. At this time, distribution of hardness of the cross section of the extruded wire rod was measured at a testing load of 25 gf, and hardness of the center and the highest hardness in the vicinity of the surface were obtained.

Furthermore, the compressive residual stress was provided with respect to each of the above wire rods by shot peeing with glass beads (provided by Fuji Manufacturing Co. Ltd., FGB#300) having an average shot size of 0.05 mm and at an impinging pressure of 0.3 MPa, so that a coverage is 100% or more, using a direct pressure type sandblasting machine (provided by Sintokogio, Ltd., MY-30AP). After shot peening, the residual stress was measured by a Cr tube bulb (a collimator diameter of 1 mm) for measuring a time of 600 seconds, using a two-dimensional detector X-ray diffraction machine (provided by Bruker AXS, D8 DISCOVER with GADDS/TXS). Here, the residual stress was calculated using an Mg (112) diffraction line(2θ=113.843°) as a diffraction line.

Figure 3:
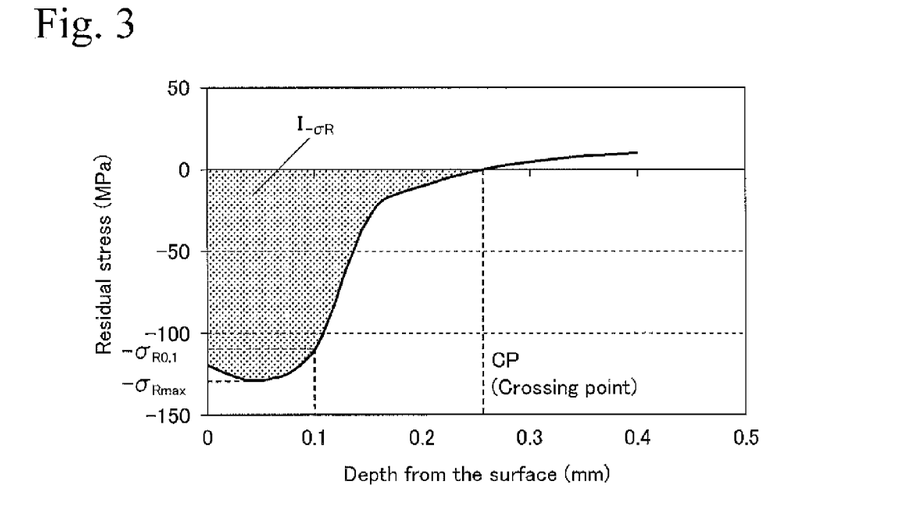
FIG. 3 is a graph showing an example of residual stress measuring distribution in Examples of the present invention.

At this time, chemical polishing was carried out on an entire surface of the wire rod surface, using a nitric acid mixed solution, and then, with respect to the above, measurements were carried out. The residual stress distribution in a depth direction was obtained by repeating this process, and the compressive residual stress distribution and the crossing point CP in a region from the surface to a depth of 0.1 mm were calculated from the results. In addition, the compressive residual stress integrated value $I_{-\sigma R}$ was calculated by integrating the compressive residual stress in a region from the surface to the crossing point in the figure showing the relationship between the depth and the residual stress. As an example, residual stress distribution of No. 7 sample is shown in FIG. 3.

Next, the average crystal grain diameter of the α-Mg phase in the vicinity of the wire rod surface was measured. Measurement of the average crystal grain diameter of the α-Mg was performed on the test piece that was subjected to the measurement of the hardness using an EBSD method (electron beam backscattering diffraction apparatus, provided by TSL) utilizing an FE-SEM (electrolysis emission type scanning electron microscope, provided by JEOL, No. JSM-7000F). The measurement was performed at a location in the vicinity of the surface in a cross section of the extruded wire rod at which the highest hardness was obtained for Examples at analysis magnification of 10,000 times and for Comparative Examples (Nos. 33 and 34) at analysis magnification of 2,000 times.

0.2% proof stress was 650 MPa or more was provided. The high strength and high ductility portion in the inner portion and the higher strengthened portion in the vicinity of the surface were gradually connected and did not have clear

TABLE 2

| No | 0.2% Proof stress (MPa) | Elongation (%) | Hardness (HV) Center | Hardness (HV) Highest value in the vicinity | Compressive residual stress (−MPa) Outermost surface | Compressive residual stress (−MPa) Depth from surface of 0.1 mm | CP (mm) | $I_{-\sigma R}$ (MPa·mm) | Surface roughness Rz (μm) | Average crystal diameter of α-Mg phase (μm) | Note |
|---|---|---|---|---|---|---|---|---|---|---|---|
| 3 | 670 | 4.0 | 169 | 168 | 200.3 | 168.3 | 0.23 | 27.8 | 18.75 | — | Comparative Example |
| 4 | 663 | 5.0 | 159 | 180 | 214.5 | 178.5 | 0.24 | 30.3 | 10.71 | 0.21 | Example |
| 5 | 643 | 5.2 | 158 | 182 | 216.9 | 181.5 | 0.35 | 40.8 | 10.35 | 0.26 | Example |
| 6 | 620 | 5.3 | 160 | 181 | 215.3 | 183.2 | 0.23 | 30.2 | 10.98 | 0.23 | Example |
| 7 | 613 | 5.9 | 154 | 178 | 210.5 | 179.3 | 0.28 | 33.8 | 10.18 | 0.59 | Example |
| 8 | 580 | 6.2 | 152 | 170 | 206.3 | 172.5 | 0.29 | 33.6 | 9.83 | 0.35 | Example |
| 9 | 563 | 6.4 | 146 | 168 | 200.5 | 169.5 | 0.22 | 27.1 | 11.38 | — | Comparative Example |
| 10 | 532 | 6.7 | 141 | 156 | 189.1 | 158.6 | 0.28 | 30.1 | 10.58 | — | Comparative Example |
| 11 | 510 | 10.3 | 138 | 155 | 188.5 | 154.3 | 0.29 | 30.1 | 10.34 | — | Comparative Example |
| 12 | 493 | 13.3 | 137 | 140 | 169.4 | 138.3 | 0.27 | 25.6 | 10.13 | — | Comparative Example |
| 13 | 540 | 7.2 | 144 | 159 | 188.3 | 158.9 | 0.22 | 25.4 | 11.69 | — | Comparative Example |
| 14 | 582 | 6.0 | 154 | 173 | 208.5 | 175.3 | 0.21 | 27.2 | 10.35 | 0.27 | Example |
| 15 | 660 | 5.1 | 165 | 183 | 226.9 | 186.4 | 0.29 | 36.3 | 9.66 | 0.20 | Example |
| 16 | 422 | 3.8 | 164 | 165 | 198.8 | 165.3 | 0.24 | 28.1 | 12.35 | — | Comparative Example |
| 17 | 579 | 5.2 | 163 | 173 | 203.5 | 176.8 | 0.23 | 29.2 | 10.13 | 0.36 | Example |
| 18 | 623 | 5.5 | 161 | 183 | 219.1 | 183.6 | 0.22 | 29.4 | 10.19 | 0.62 | Example |
| 19 | 601 | 6.1 | 159 | 174 | 206.3 | 176.7 | 0.21 | 27.4 | 10.34 | 0.76 | Example |
| 20 | 483 | 8.2 | 143 | 152 | 181.1 | 155.8 | 0.22 | 24.9 | 9.54 | — | Comparative Example |
| 21 | 645 | 5.0 | 158 | 175 | 206.5 | 176.9 | 0.25 | 31.0 | 10.44 | 0.33 | Example |
| 22 | 633 | 5.1 | 144 | 159 | 190.8 | 157.8 | 0.26 | 28.4 | 10.32 | — | Comparative Example |
| 23 | 483 | 7.7 | 136 | 142 | 172.6 | 145.5 | 0.24 | 24.7 | 10.57 | — | Comparative Example |
| 24 | 551 | 7.0 | 153 | 172 | 205.6 | 173.8 | 0.29 | 33.9 | 11.56 | 0.69 | Example |
| 25 | 655 | 5.0 | 159 | 177 | 211.0 | 177.5 | 0.21 | 27.5 | 10.39 | 0.33 | Example |
| 27 | 615 | 5.4 | 161 | 182 | 218.6 | 186.7 | 0.25 | 32.7 | 10.78 | 0.30 | Example |
| 28 | 622 | 5.2 | 158 | 176 | 205.8 | 178.9 | 0.23 | 29.5 | 10.95 | 0.19 | Example |
| 29 | 625 | 5.2 | 159 | 179 | 214.6 | 174.8 | 0.28 | 33.2 | 13.57 | 0.53 | Example |
| 30 | 600 | 5.1 | 158 | 155 | 189.5 | 155.3 | 0.26 | 28.0 | 18.84 | — | Comparative Example |
| 32 | 408 | 10.6 | 109 | 129 | 135.4 | 125.6 | 0.29 | 24.5 | 21.13 | — | Comparative Example |
| 33 | 399 | 10.0 | 102 | 130 | 136.7 | 128.5 | 0.28 | 24.4 | 12.69 | 6.76 | Comparative Example |
| 34 | 206 | 24.0 | 57 | 62 | 31.2 | 25.5 | 0.19 | 3.8 | 14.17 | 8.75 | Comparative Example |

In Table 2, the test pieces in which the highest hardness in the vicinity of the surface of the wire rod was 170 HV or more, 0.2% proof stress of 550 MPa or more and elongation was 5.0% or more in the inner portion, the compressive residual stress distribution in a region from the surface to a depth of 0.1 mm was 50 MPa or more, and the $I_{-\sigma R}$ was 7 MPa·mm or more, were Examples of the present invention (Examples Nos. 4 to 8, 14, 15, 17 to 19, 21, and 24 to 29). The strength in the Examples was very high compared to the Comparative Examples No. 32 to 34, which were produced from the cast billets or the wrought billets. The inner portion of the wire rod had a high strength and high ductility portion in which the 0.2% proof stress was 551 MPa or more and the elongation was 5% or more was. In these Examples, a higher strengthened portion in which the highest hardness in the vicinity of the wire rod surface was 170 HV or more and the boundaries, whereby the whole wire rod had superior strength and toughness and sufficient formability.

Furthermore, in the Examples, the compressive residual stress of the outermost surface was high, the compressive residual stress in a region from the surface to a depth of 0.1 mm was 170 MPa or more, and the compressive residual stress in the vicinity of the surface was high. In addition, CP was 0.2 mm or more, and $I_{-\sigma R}$ was 27 MPa·mm or more, the high compressive residual stress was obtained from the wire rod surface to the inner portion. Therefore, a high degree of fatigue strength can be obtained, even if at least one of bending stress and twisting stress primarily acts.

As shown in Table 1, in Samples Nos. 1 and 2, deformation resistance was large since the extruding temperature (heating temperature of the billet) was low, breakage occurred in extruding, and a wire rod was not obtained. In Sample No. 3, rough surface and cracks were generated in the surface layer, although a wire was obtained, and the inner portion was deteriorated in ductility as strengthening was promoted, whereby elongation of 5% or more which was required for formability was not obtained.

In Samples Nos. 9 to 12 and 22, since the extruding temperature was greater than 335° C., refinement of structure caused by dynamic recrystallization and work hardening caused by introduction of strain were not sufficient. As a result, the highest hardness in the vicinity of the surface was less than 170 HV. Therefore, the yield stress in the vicinity of the surface was insufficient for using the wire rod for strong parts in which at least one of bending stress and twisting stress primarily acts. In Sample No. 13, since amounts of Ni and Y were small at 1.0 atomic %, solid solution strengthening in the α-Mg phase and amount of precipitated high strength Mg—Ni—Y type compound were small, the highest strength of 170 HV or more in the vicinity of the surface was not obtained.

In Sample No. 16, since the sintering temperature was less than 350° C., a densified billet was not obtained. In the billet, a large amount of unbonded boundaries of fibers, which was difficult to remove by the subsequent process of plastic working and was a defect of a wire rod after extruding, were present, and bonding strength at contacting points of the magnesium alloy fibers was insufficient. As a result, sufficient 0.2% proof stress and elongation were not obtained, although the hardness was improved. In Sample No. 20, since the sintering temperature was more than 500° C., phase effective for high strengthening was decomposed and the crystal grain was coarse, whereby the hardness in the vicinity of the surface was less than 170 HV.

In Sample No. 23, since the extruding ratio was less than 5, the work hardening caused by introduction of strain was insufficient and the hardness in the vicinity of the surface was less than 170 HV. In Sample No. 26, since the extruding ratio was more than 13, the wire rod was greatly strengthened, but toughness was low and breakage occurred in extruding. In Sample No. 30, since the extruding speed was more than 2.5 mm/second, lubrication was insufficient, whereby rough surfaces such as scuffing in the surface of the wire rod were formed. Deformation strain was released by such a rough surface, and the hardness in the vicinity of the surface was less than 170 HV, although a 0.2% proof stress of 600 MPa and an elongation of 5.1% in the inner portion were obtained.

In Samples Nos. 31 and 32, since the billet was a cast metal, the α-Mg phase was coarse and the precipitated compound phases were also coarse. As a result, the deformation resistance and accumulation of strain were large. Therefore, in Sample No. 31, breakage occurred in extruding, and in Sample No. 32, rough surfaces and cracks were formed in extruding. In Sample No. 33, sufficient properties were not obtained, although breakage did not occur since the extruding temperature was high. In Sample No. 34, since the billet was a commercially available expanded material, it had high ductility but did not have high strength, and other characteristics were also insufficient.

As shown in Table 2, in Examples, the average crystal grain diameter of the α-Mg was very fine at 0.19 to 0.76 μm compared to 6.76 μm and 8.75 μm of Samples Nos. 33 and 34, which are Comparative Examples, respectively. It is apparent that the fine crystal grain contributes to improvement of the hardness.

Figure 4:
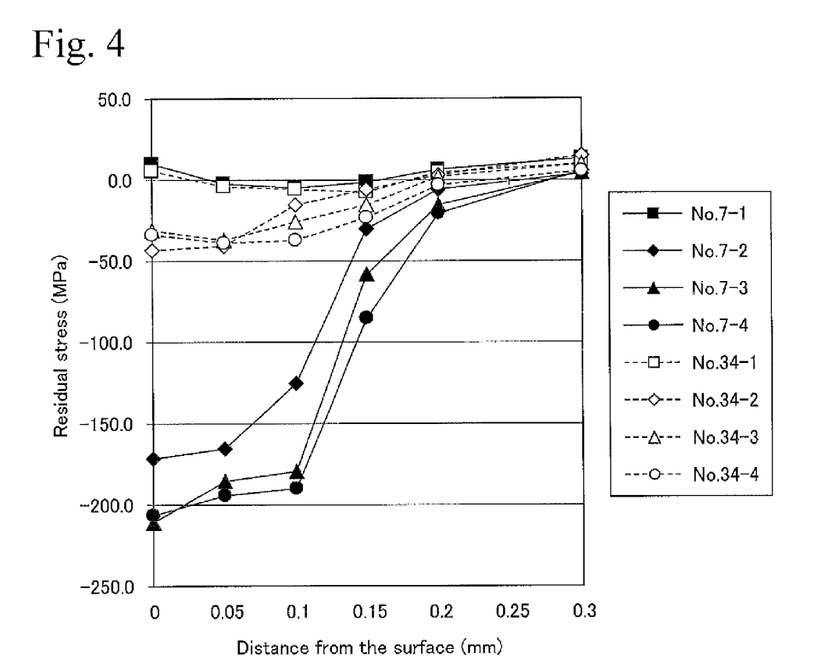
FIG. 4 is a graph showing a relationship between distance from a wire rod surface of a magnesium alloy member and value of residual stress in Examples of the present invention.

Next, Sample No. 7, which is an Example, and Sample No. 34, which is a Comparative Example were produced by shot peening in the same manner as in the above process, except for the impinging pressure of 0.1 to 0.5 MPa. Then, the residual stress distribution was measured by the above method. The results are shown in Table 3 and FIG. 4.

TABLE 3

| No. | Composition (at %) Mg | Ni | Y | SP impinging pressure (MPa) | Compressive residual stress on outermost surface (MPa) | Highest compressive residual stress (MPa) | Compressive residual stress in a region from surface to depth of 0.1 mm (MPa) | CP (mm) | I_σR (MPa·mm) | Surface roughness Rz (μm) |
|---|---|---|---|---|---|---|---|---|---|---|
| 7-1 | 93.5 | 3.0 | 3.5 | No impinging | −10.2 | 7.2 | 4.8 | — | — | 5.21 |
| 7-2 | ↑ | ↑ | ↑ | 0.1 | 171.5 | 171.5 | 125.0 | 0.262366 | 22.6 | 8.18 |
| 7-3 | ↑ | ↑ | ↑ | 0.3 | 210.5 | 210.5 | 179.3 | 0.2775 | 33.8 | 10.18 |
| 7-4 | ↑ | ↑ | ↑ | 0.5 | 206.5 | 206.5 | 189.8 | 0.278682 | 35.9 | 15.12 |
| 34-1 | AZ31 | | | No impinging | −5.7 | 4.8 | 5.8 | — | — | 2.33 |
| 34-2 | ↑ | | | 0.1 | 43.5 | 43.5 | 15.5 | 0.182353 | 2.2 | 7.78 |
| 34-3 | ↑ | | | 0.3 | 31.2 | 37.4 | 25.5 | 0.194286 | 3.8 | 14.17 |
| 34-4 | ↑ | | | 0.5 | 33.8 | 39.2 | 37.2 | 0.239773 | 6.3 | 11.18 |

The compressive residual stress could be provided at the wire rod surface by the shot peening. As a result, the fatigue strength required when at least one of bending stress and twisting stress acted could be improved in comparison with that before shot peening. As is apparent from Table 3 and FIG. 4, in Sample No. 7, which is an Example, larger and deeper compressive residual stress could be obtained than that of Sample No. 34, which is a Comparative Example. According to the present invention, with the impinging pressure of 0.1 to 0.5 MPa, the magnesium alloy member in which the compressive residual stress in a region from the surface to a depth of 0.1 mm is 50 MPa or more, the CP is 0.2 mm or more, the $I_{\sigma R}$ is 7 MPa·mm or more, and the highest surface roughness (Rz) is 20 μm or less, having high fatigue strength, can be obtained.

Here, in the above description, the wire rod was produced by shot peening on a plastic working material; however, the compressive residual stress can be provided by shot peening after the plastic working material was formed in a desired product shape, and in this case the same effect as that described above can also be obtained.

The magnesium alloy member of the present invention is suitable for a high-strength part in which at least one of bending stress and twisting stress primarily acts. By using the magnesium alloy member of the present invention, great weight reduction can be achieved without increase in size of parts, compared to conventional steel parts. The weight reduction is very effective for, for example, automobile parts such as seat frames, which have a higher proportion of weight, and for springs (suspension springs, valve springs, clutch torsion springs, torsion bars, stabilizers) which are required to have high strength.

The invention claimed is:

1. A magnesium alloy member formed as a wire rod, in which at least one of bending stress and twisting stress primarily acts, wherein the magnesium alloy consists of 2 to 5 atomic % of Ni, 2 to 5 atomic % of Y, and the balance of Mg and inevitable impurities, and the wire rod comprises: a surface portion having the highest hardness of 170 HV or more in the vicinity of the surface; and an inner portion having a 0.2% proof stress of 550 MPa or more and an elongation of 5% or more at room temperature, and the wire rod has the highest compressive residue stress in the vicinity of the surface of 50 MPa or more.

2. The magnesium alloy member according to claim 1, wherein compressive residual stress in a region from the surface of the wire rod to a depth of 0.1 mm is 50 MPa or more and a crossing point is 0.2 mm or more.

3. The magnesium alloy member according to claim 1, wherein the portion having the highest hardness in the vicinity of the surface has an average crystal grain diameter of 1 μm or less measured by an EBSD method.

4. The magnesium alloy member according claim 1, wherein the highest surface roughness (Rz) is 20 μm or less.

5. The magnesium alloy member according to claim 1, wherein the wire rod has a diameter of 3 to 13 mm.

6. The magnesium alloy member according to claim 5, wherein the member is a spring.

7. A production method for a magnesium alloy member, comprising:
   a step for yielding a raw material in a form of foil strips, foil pieces, or fibers of a magnesium alloy by a rapid solidification method,
   a sintering step for forming a billet by bonding, compressing, and sintering the raw material,
   a step for plastic working the billet to form a plastic worked member,
   a forming step for forming the plastic worked member, and
   a step for providing compressive residual stress to the plastic worked member after forming,
   thereby obtaining the magnesium alloy member according to claim 1.

8. A production method for a magnesium alloy member, comprising:
   a step for forming fibers by a molten metal extraction method,
   a sintering step for forming a billet by bonding, compressing, and sintering the fibers,
   an extruding step for directly charging the billet into a container of a press machine and extruding the billet to form an extruded member,
   a forming step for forming the extruded member, and
   a step for providing compressive residual stress to the extruded member after forming by shot peening,
   thereby obtaining the magnesium alloy member according to claim 1.

9. A magnesium alloy member formed as a wire rod, in which at least one of bending stress and twisting stress primarily acts, wherein the magnesium alloy consists of 2 to 5 atomic % of Ni, 2 to 5 atomic % of Y, and the balance of Mg and inevitable impurities, and the wire rod comprises: a surface portion having the highest hardness of 170 HV or more in the vicinity of a surface thereof; and an inner portion having a 0.2% proof stress of 550 MPa or more and an elongation of 5% or more at room temperature, and the wire rod has an integrated value $I_{-oR}$ of compressive residue stress in a region from the surface to a crossing point of 7 MPa·mm or more, when a depth from the surface in which a value of compressive residual stress in residual stress distribution from the surface toward a depth direction is zero is set to be a crossing point.

10. The magnesium alloy member according to claim 9, wherein compressive residual stress in a region from the surface of the wire rod to a depth of 0.1 mm is 50 MPa or more and a crossing point is 0.2 mm or more.

11. The magnesium alloy member according to claim 9, wherein the portion having the highest hardness in the vicinity of the surface has an average crystal grain diameter of 1 μm or less measured by an EBSD method.

12. The magnesium alloy member according to claim 9, wherein the highest surface roughness (Rz) is 20 μm or less.

13. The magnesium alloy member according to claim 9, wherein the wire rod has a diameter of 3 to 13 mm.

14. The magnesium alloy member according to claim 13, wherein the member is a spring.

15. The magnesium alloy member according to claim 9, wherein the integrated value $I_{-oR}$ of compressive residue stress is 10 MPa·mm or more.

16. The magnesium alloy member according to claim 9, wherein the integrated value $I_{-oR}$ of compressive residue stress is 20 MPa·mm or more.

17. The magnesium alloy member according to claim 9, wherein the compressive residual stress in a region from the surface of the wire rod to a depth of 0.1 mm is 172.5 MPa or more.

18. A production method for a magnesium alloy member, comprising:
   a step for yielding a raw material in a form of foil strips, foil pieces, or fibers of a magnesium alloy by a rapid solidification method,
   a sintering step for forming a billet by bonding, compressing, and sintering the raw material,
   a step for plastic working the billet to form a plastic worked member,
   a forming step for forming the plastic worked member, and
   a step for providing compressive residual stress to the plastic worked member after forming,
   thereby obtaining the magnesium alloy member according to claim 9.

19. A production method for a magnesium alloy member, comprising:
   a step for forming fibers by a molten metal extraction method,
   a sintering step for forming a billet by bonding, compressing, and sintering the fibers,
   an extruding step for directly charging the billet into a container of a press machine and extruding the billet to form an extruded member,
   a forming step for forming the extruded member, and
   a step for providing compressive residual stress to the extruded member after forming by shot peening,
   thereby obtaining the magnesium alloy member according to claim 9.

* * * * *